United States Patent
Kitahara et al.

(10) Patent No.: US 11,178,175 B2
(45) Date of Patent: Nov. 16, 2021

(54) COMBO-SQUATTING DOMAIN LINKAGE

(71) Applicant: INTERNATIONAL BUSINESS MACHINES CORPORATION, Armonk, NY (US)

(72) Inventors: Hirokuni Kitahara, Tokyo (JP); Yuji Watanabe, Tokyo (JP); Fumiko Akiyama, Tokyo (JP); Alisa Arno, Saitama (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 305 days.

(21) Appl. No.: 16/542,561

(22) Filed: Aug. 16, 2019

(65) Prior Publication Data
US 2021/0051174 A1 Feb. 18, 2021

(51) Int. Cl.
*H04L 29/06* (2006.01)

(52) U.S. Cl.
CPC ...... *H04L 63/1466* (2013.01); *H04L 63/1425* (2013.01); *H04L 63/1475* (2013.01); *H04L 63/1483* (2013.01)

(58) Field of Classification Search
CPC ............. H04L 63/1466; H04L 63/1483; H04L 63/1475; H04L 61/302; H04L 61/1511; H04L 63/0236; H04L 63/1441
See application file for complete search history.

(56) References Cited

U.S. PATENT DOCUMENTS

| | | | |
|---|---|---|---|
| 2012/0042381 A1* | 2/2012 | Antonakakis | H04L 63/1483 726/22 |
| 2017/0295187 A1* | 10/2017 | Havelka | H04L 63/1441 |
| 2018/0139235 A1 | 5/2018 | Desai et al. | |
| 2018/0337947 A1 | 11/2018 | Schiffman | |

FOREIGN PATENT DOCUMENTS

WO 2019038755 A1 2/2019

OTHER PUBLICATIONS

Felegyhazi, "On the Potential of Proactive Domain Blacklisting", USENIX Conference on Large-Scale Exploits and Emergent Threats, Jan. 2010, 8 pages.

(Continued)

*Primary Examiner* — Huan V Doan
(74) *Attorney, Agent, or Firm* — Tutunjian & Bitetto, P.C.; Randall Bluestone

(57) ABSTRACT

A computer-implemented method for linking combo-squatting domains is provided. The method includes grouping domain names into nameserver groups based on a nameserver for each of the domains. Each of the domain names contain valued words. The method also includes splitting words in each domain name and generating a wordlist for each of the nameserver groups. The method further includes finding feature words among the nameserver groups, and extracting malicious domain names which contain the feature words in each of the nameserver groups. The method further includes outputting, for each of the nameserver groups, the malicious domain names and corresponding registrant identifying data based on the feature words.

20 Claims, 12 Drawing Sheets

(56) References Cited

OTHER PUBLICATIONS

Kintis, "Hiding in Plain Sight: A Longitudinal Study of Combosquatting Abuse", ACS Conference on Computer and Communications Security, Oct. 2017, pp. 569-586.
Tian, "Needle in a Haystack: Tracking Down Elite Phishing Domains in the Wild", Internet Measurement Conference, Oct. 2018, pp. 429-442.
Hao, "PREDATOR: Proactive Recognition and Elimination of Domain Abuse of Time-Of-Registration", Conference on Computer and Communications Security, Oct. 2016, pp. 1568-1579.
Mell, Peter, et al., "The NIST Definition of Cloud Computing," 2011, 7 pages.

\* cited by examiner

| 305 | Feature Word 310 | Domain Name 315 | Registrant Name 320 | Registrant Country 325 |
|---|---|---|---|---|
| 0 | anc | trade1-trade2-anc.com | Person 1 | Country A |
| 1 | anc | trade1-trade3-anc.com | Person 1 | Country A |
| 2 | anc | trade1a-trade2-anc.com | Person 1 | Country A |
| 3 | anc | trade2-trade1a-anc.com | Person 1 | Country A |
| 4 | anc | trade2trade1aanc.com | Person 2 | Country A |

FIG. 3

| 305 | Feature Word | Domain Name | Registrant Name | Registrant Country |
|---|---|---|---|---|
| 0 | take | itaketrade4.com | Person 3 | Country B |
| 1 | take | wetaketrade4.com | Person 3 | Country B |
| 2 | take | wetaketrade4.net | Person 3 | Country B |

| 340 → 305 | Feature Word 310 | Domain Name 315 | Registrant Name 320 | Registrant Country 325 |
|---|---|---|---|---|
| 0 | orange | trade1-trade2-anc.com | Whois Privacy A | Country C |
| 1 | orange | trade1-trade3-orange.com | Whois Privacy B | Country C |
| 2 | orange | trade1-account-orange.com | Whois Privacy C | Country C |
| 3 | orange | trade1-support-orange.com | Whois Privacy D | Country C |

| | Feature Word | Domain Name | Registrant Name | Registrant Country |
|---|---|---|---|---|
| 0 | supp | supp79trade5.com | Registration Private | Country B |
| 1 | supp | suppuk101trade5.com | Person 4 | Country B |
| 2 | supp | trade5suppgratis.com | Domain Administrator | Country B |

FIG. 6

| Index 305 | Domain Name 315 | Registrant Name 320 | Registrant County 325 |
|---|---|---|---|
| 0 | revle-unlocked-rclod.com | | |
| 1 | revle-japan-information.com | | |
| 2 | verification-revleid-revle.com | Barbara Lynn Miswas | UNITED KINGDOM |
| 3 | verify-revleid-revie.com | Barbara Lynn Miswas | UNITED KINGDOM |
| 4 | verify-revie-revleid.com | Barbara Lynn Miswas | UNITED KINGDOM |
| 5 | rcloudd-revle.com | Brian Smithkeller | UNITED KINGDOM |
| 6 | rdas-revle.com | Brian Smithkeller | UNITED KINGDOM |
| 7 | informa-revle-secure.com | Brian Smithkeller | UNITED KINGDOM |
| 8 | mail-revle-services.com | Brian Smithkeller | UNITED KINGDOM |
| 9 | manage-revle.com | Brian Smithkeller | UNITED KINGDOM |
| 10 | iforgotid-revle.com | C R Redwards | UNITED KINGDOM |

COMBO-SQUATTING DOMAIN LINKAGE

BACKGROUND

The present invention generally relates to computer networking systems and methods, and more particularly to detecting malicious domains.

The incidence of malicious domains, which are also referred to as ComboSquatting (CS) domains, exist on the Internet. CS domains can include a company and/or service name and one or more words (for example, theirtrademark-login.com). These company/service names in CS domains are sometimes referred to as trademarks (for example, <trademark>).

SUMMARY

In accordance with an embodiment of the present invention, a method for linking combo-squatting domains is provided. The method includes grouping domain names into nameserver groups based on a nameserver for each of the domains. Each of the domain names contain valued words. The method also includes splitting words in each domain name and generating a wordlist for each of the nameserver groups. The method further includes finding feature words among the nameserver groups, and extracting malicious domain names which contain the feature words in each of the nameserver groups. The method further includes outputting, for each of the nameserver groups, the malicious domain names and corresponding registrant identifying data based on the feature words.

In accordance with an embodiment of the present invention, a system for linking combo-squatting domains includes a memory device for storing program code, and a processor device operatively coupled to the memory device and configured to execute program code stored on the memory device. The processor device groups domain names into nameserver groups based on a nameserver for each of the domains. Each of the domain names contain valued words. The processor device splits words in each domain name and generates a wordlist for each of the nameserver groups. The processor device finds, from the wordlist, feature words among the nameserver groups. The processor device then extracts malicious domain names which contain the feature words in each of the nameserver groups, and outputs, for each of the nameserver groups, the malicious domain names and corresponding registrant identifying data based on the feature words.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 3 is a block diagram showing a feature word registrant table, in accordance with an embodiment of the present invention;

FIG. 4 is a block diagram showing a feature word registrant table, in accordance with an embodiment of the present invention;

FIG. 5 is a block diagram showing a feature word registrant table, in accordance with an embodiment of the present invention;

FIG. 6 is a block diagram showing feature word registrant table, in accordance with an embodiment of the present invention;

FIG. 8 is a block diagram showing a domain name registrant listing, in accordance with an embodiment of the present invention;

DETAILED DESCRIPTION

Embodiments of the present invention relate generally to a method and system for to extracting domain names and registrant identifying information (for example, Whois data, etc.), grouping the extracted names and finding a feature word from the domain names in each name server. More specifically, the example embodiments include the features of extracting domain names, which contain a valued word (for example, a known name or Trademark, etc.), and registrant identifying information (such as Whois data), and grouping the extracted names and data by name servers. Embodiments of the present invention then find a feature word from the domain names in each name server by applying a feature extraction technique, and extract domain names, which contain the feature word. The extracted domain names and registrant identifying information thereof are then output as candidates to be potentially identified as malicious domains.

The extracted domain names and registrant identifying information is in some instances (identified as potentially) registered by the same person. According to example embodiments, the known name is a trademark, and the feature extraction technique is inverse document frequency (IDF). Inverse document frequency is a numerical statistic that reflects how important a word (or the trademark) is to a document in a collection or corpus.

Embodiments of the present invention also relate generally to finding identical registrants who are using one or more unique words (for example, sequence of characters) in their domain names.

Embodiments of the present invention also relate to identifying combo-squatting domain names, which are registered by any identical user name, by converting domain names to numeric vectors and evaluating the vector information to determine relevance between the two domains.

Exemplary applications/uses to which the present invention can be applied include, but are not limited to identifying domain registrants with registrant identifying information (such as Whois data) that has been anonymized. Malicious domain registrants can be identified without (complete) registrant identifying information and appropriate action (for example, quarantine or other safety measure), warning and/or safeguards can then be implemented. Malicious domain registrants can include those domain registrants that provide domains with names that would imply a purpose other than that (in some instances, illegitimate) intended by the domain registrant. For example, the malicious domain registrant can seek to appear as a legitimate website (for example, a commercial business, a legitimate application website (video game, banking), etc.) while in actuality serving illegitimate purposes (such as phishing, malware, ransomware, spyware, spoofing, virus, trojans, grayware, etc.)

Figure 1:
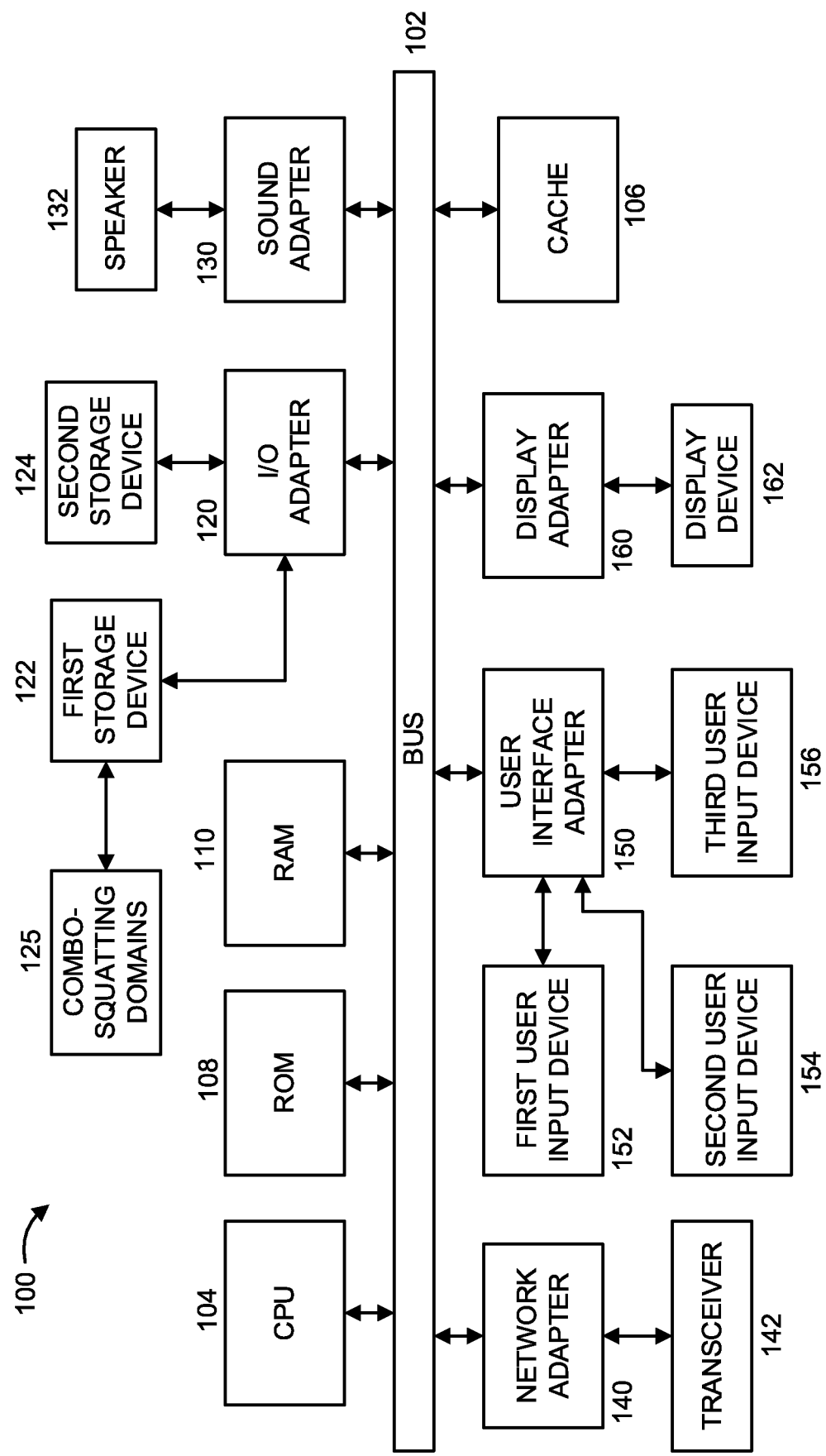
FIG. 1 is a block diagram showing an exemplary processing system to which the present invention may be applied, in accordance with an embodiment of the present invention.

Referring now to the drawings in which like numerals represent the same or similar elements and initially to FIG. 1, an exemplary processing system 100 to which the present invention may be applied is shown in accordance with one embodiment.

The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102.

A first storage device 122 and a second storage device 124 are operatively coupled to system bus 102 by the I/O adapter 120. First storage device 122 can store combo-squatting domains 125, such as determined herein with respect to FIGS. 2 to 10. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
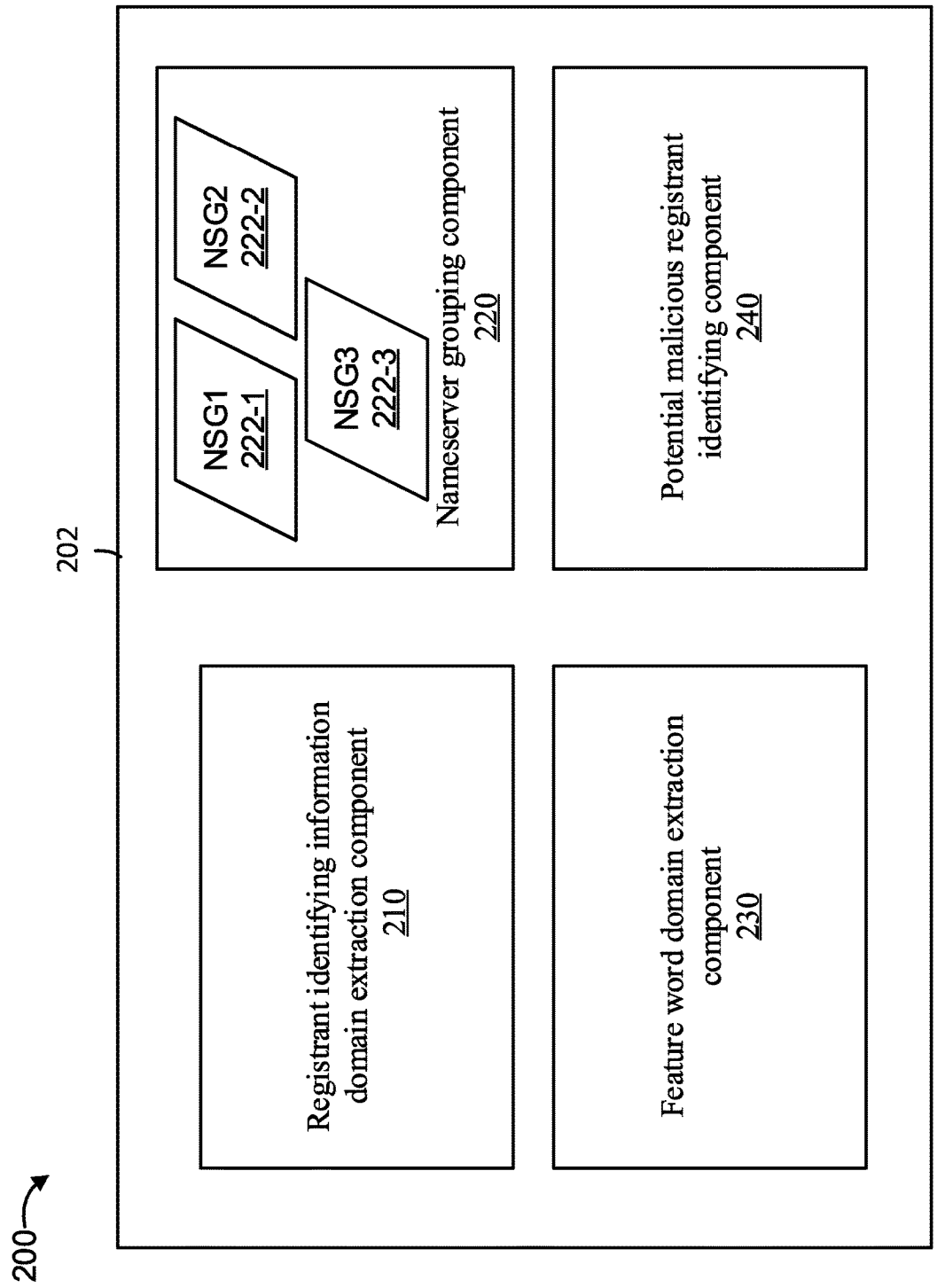
FIG. 2 is a block diagram showing a system for combo-squatting domain linkage, in accordance with an embodiment of the present invention.

Referring now to FIG. 2, a block diagram showing a system for combo-squatting domain linkage is illustrated, in accordance with example embodiments.

As shown in FIG. 2, system 200 includes a domain and registrant identifying information domain extraction component 210, a nameserver grouping component 220, a feature word domain extraction component 230 and a potential malicious registrant identifying component 240 deployed on a device 202. System 200 identifies false name/anonymous domain registrants. This facilitates identification of persons or entities that are impersonating and/or squatting or "combo-squatting" (for example, domain squatting and/or cybersquatting).

The components of system 200 work together (for example, interwork, work in conjunction with each other, etc.) to perform registrant identification. The identification of the registrant can then be used to perform additional processes, such as precautionary measures to limit potential malicious activity and/or access to the device 202, accounts associated with the user of the device 202, information generated by the user of the device 202 (for example, global positioning system (GPS) information), or networks associated with the device 202, etc. The system 200 can identify cybercriminals that use specific nameservers (such as, for example, a single nameserver or group of nameservers) for multiple malicious domains.

Registrant identifying information domain extraction component 210 accesses, for example, registrant identifying data (such as, for example, Whois data, or other registrant identifying data) as input data, and detects identical domain registrants (for example, a common domain registrant for multiple registrant identifying data). More particularly, registrant identifying information domain extraction component 210 extracts domain names, which contain a known or valued name (for example, a trademark), and, registrant identifying information, and then provides this information to nameserver grouping component 220, which groups into nameserver groups 222 the extracted names and data by name servers (for example, name server group (NSG) 1 222-1, NSG2 222-2 and NSG3 222-3, by way of illustration).

Feature word domain extraction component 230 finds a feature word(s) from the domain names in each name server by applying a feature extraction technique, and extracts domain names, which contain the feature word. For example, feature word domain extraction component 230 can apply inverse document frequency (IDF), term frequency—inverse document frequency (TF-IDF), etc. Feature word domain extraction component 230 can extract a feature word (such as, by way of illustration, "anc" as described with respect to FIG. 3).

Potentially malicious registrant identifying component 240 outputs the extracted domain names and the (in some instances, anonymized) registrant identifying information (for example, Whois data) thereof as candidates, which may be registered by the same person. The potentially malicious domains are domains that belong to other than the owner of the legitimate name (or trademark) and, in some instances, are identified as possibly belonging to a malicious registrant.

The known name in many instances can be a trademark, and the feature extraction technique can be IDF, TF-IDF, etc. Potential malicious registrant identifying component 240 can also implement appropriate protective measures, such as providing a warning, disabling potentially harmful capabilities or features of the identified domain on the user's device, reporting the domain to appropriate entities, blocking access to the malicious domain, etc.

System 200 can handle combo-squatting by calculating and comparing hash distances between original and malicious domain names, by applying neuro-linguistic programming (NLP) techniques and extracting meaningful words and transforming them into training vectors. For example, system 200 can apply retrieval and/or extraction techniques (for processing text) such as bag-of-words or Word2Vec. System 200 extracts domain names and registrant identifying information, and groups the extracted names. System 200 finds a feature word from the domain names in each name server. System 200 outputs the extracted domain names and registrant identifying information thereof as candidates, which may be registered by the same person (or entity).

FIGS. 3 and 4 illustrate feature word registrant tables, in accordance with example embodiments.

System 200, as described herein above with respect to FIG. 2, can search for domain names that include a particular trademark (for example, IBM®, Revle, etc.): System 200 aggregates domains that have at least one feature word from among the domains that include the trademark. In instances of this application, revle and lacag represents example names (for example, a trademarked name or otherwise) of companies that offer legitimate services via the Internet and particularly websites (for example, commerce, banking, music, entertainment, authentication services, etc.). System 200 can also identify variations of the names (for example, trademarks), including those words that are common mistyped variations of the trademark (for example, revie for Revle, laxag for lacag, etc.) or other identified ploys of malicious registrants (for example, to reroute domain name traffic intended for the legitimate trademark holder to the malicious entity) and implement the processes described herein.

As shown in FIGS. 3 and 4, system 200 compiles feature word registrant tables (300 (FIG. 3) and 330 (FIG. 4)) that include columns for an identifier 305 (for example, a number, shown as 0, 1, 2, 3, 4, in FIG. 3, and 0, 1, 2 in FIG. 4 by way of example) of a feature word registrant entry, a feature word 310, a domain name 315, a registrant name 320 and a registrant country 325. The feature word registrant tables can include (system 200 can collect) information from one or more domain control entities (for example, domain-control.com, by way of illustration representing an example of a name server group (NSG), etc.).

The extracted feature word 310 can include a unique or a commonly used word or character sequence that is not likely to be used by the corporate entity in combination with the trademarked words. For example, with respect to table 300, the feature word 310 can include a relatively unique, unused or unexpected character sequence, such as ANC. However, as shown in table 330, the processes described herein are not only directed towards finding rare words in general, but words rarely combined with the trademarked words in domain names (or not expected to be combined in the context of a domain name). In this instance, a commonly used word, "take" is selected as a feature word. This represents that "take" is rarely used for a domain name with the trademarked words (for example, "revle") other than this nameserver group.

The domain name 315 includes the extracted feature word combined with a trademark and/or variations or a trademark. For example, the domain name can include a combination or concatenation of the extracted feature word with one or more trademarked words associated with an entity, such as trade1-trade2-anc.com, trade1-trade3-anc.com, trade1a-trade2-anc.com, trade2-trade1a-anc.com, and trade2trade1aanc.com as shown in table 300 of FIG. 3, where each of trade1, trade 1a, trade2 and trade3 belong to (or are associated with) a same (for example, corporate) entity. For example, entry 0 in table 300 can be revle-rcloud-anc.com. In this instance the appearance of the trademarked words (Revle™ and rcloud) conveys a false perception of legitimacy (or association with the holder of the trademark). The short feature word may be glossed over by a user or assumed to be a processing word of the legitimate (for example, trademarked) company.

As shown in table 330 of FIG. 4, the commonly used word that is unlikely to be used by the owner of the trademark in that context (for example, "take") can be included with the trademarked word (shown in table 330 as itaketrade4.net, wetaketrade4.com and wetaketrade4.net). For example, where the trademark word is RevlePay, the domain name 315 can include itakerevlepay.net, wetakerevlepay.com and wetakerevlepay.net.

In addition to searching for the feature word combined with the trademarked word, the system 200 can search for the (identified as probably/possibly associated with a malicious entity) feature word combined with other similar trademarked words (for example, names of companies that offer similar services, such as payment services companies, entertainment companies, financial services companies, etc.). The other similar trademarked words can be identified by companies that offer similar services in a particular space, such as payment applications, entertainment applications, etc. For example, the registrant for itakerevlepay.net, wetakerevlepay.com and wetakerevlepay.net can be compared to registrants for itakeFroolagpay.net, wetakeFroolagpay.com and wetakeFroolagepay.net or other similar sequences, where Froolag represents a company in a payment services space, similar to Revle, to determine whether a same entity has registered these potentially malicious domain names 315.

The registrant name 320 can include (or be) a personal name of an individual (for example, a given name and surname) or an entity name. For example, referring to FIG. 3, as shown in table 300, registrant name 320 of person 1 can include LanXiao Qiang and registrant name 320 of person 2 can include Li Zhen Guo. The registrant name 320 of person 3 in table 330 (with regard to FIG. 4) can include, for example, Joe Jones.

The registrant country 325 can include a country of the registrant, for example Country A can include China and Country B can include the United States.

FIGS. 5 and 6 illustrate feature word registrant tables 340 (FIG. 5) and 350 (FIG. 6), in accordance with example embodiments.

In some instances, the registrant name 320 can be (at least partially) anonymized. For example, as shown with respect to table 340 (FIG. 5), the registrant name(s) 320 of the person (or entity) that registered the domain names 315 has been anonymized 345 (for example, anonymized registrant information illustrated, for example, as Whois Privacy A, Whois Privacy B, Whois Privacy C, and Whois Privacy D).

In some instances, a same anonymous entity can be identified as the person who registered multiple domain names 315. In other instances, the system 200 can analyze the feature words 310 along with purportedly (or based on anonymized different identifiers) different anonymous entities that are registered in a same country or have other similar information to determine that the different anonymized identifiers are likely associated with a same malicious person or entity.

System 200 can correctly extract test domains which are added manually to the domain register for experiment. For example, a test feature word "orange" can be combined with a trademark word in a similar manner as observed (for example, via a vector similarity detection process) for malicious entities. System 200 can train to detect the domain names 315 associated with malicious entities or persons. The registrant country (Country C, for example, Japan), can be used as an indicator that the domain names 315 are to be (or should be) aggregated as belonging to a same malicious entity.

System 200 can identify highly probable (for example obvious) instances of domains which are to be aggregated (based on a same entity) even though the registrant identifying information (for example, Whois Data) for the domains is anonymized. For example, as shown with respect to table 350 (FIG. 6), the feature word 310 (for example, supp) associated with the anonymized potentially malicious entity has been appended to a trademarked word (trade5, for example, Froolag help center, Revle, etc., associated with a legitimate entity to from a malicious domain name 315 (for example, supp79trade5.com, suppuk101trade5.com, trade5suppgratis.com, etc.). In some instances, anonymized data can be analyzed with respect to non-anonymized data (for example, a name of Person 4, such as John Smith, etc.) to identify persons behind the anonymized (for example, Whois, registration private, domain administrator, etc.) data.

System 200 can receive data from other systems and use that data with the registrant information to identify patterns of potentially malicious entities. These can include content and websites in which the malicious domain names 35 have been identified. System 200 can also identify words within the domain names used as inducement (for example, gratis, free, easy, complimentary, etc.) by malicious entities.

Figure 7:
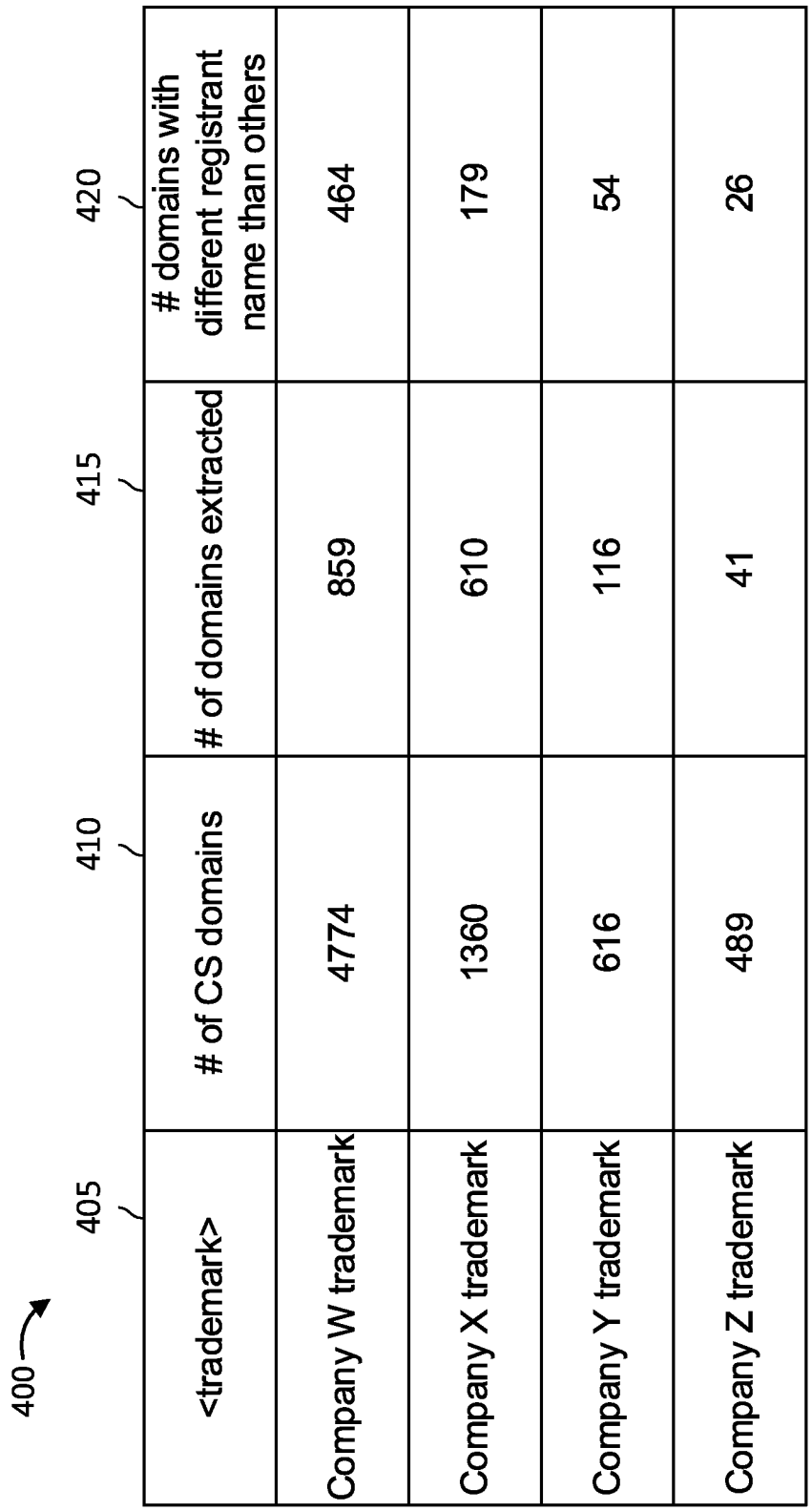
FIG. 7 is a block diagram showing a domain registrant extraction table, in accordance with an embodiment of the present invention.

FIG. 7 is a block diagram showing a domain registrant extraction table, in accordance with example embodiments of the present invention.

As shown in table 400, the domain registrant extraction table include a trademark 405, a number of combo-squatting domains (# of CS domains 410), a number (#) of domains extracted 415, and a number of domains with different registrant name than the others 420.

The trademark 405 can include a company name (company W to Z trademark, for example, Revle, Froolag, Lacag, etc.) or other trademark or publicly recognizable name of an entity, individual or company. The number of combo-squatting domains 410 represents an overall number of CS domains detected (for example, shown as 4774, 1360, 616, 489).

The number of domains extracted 415 includes those domains 315 containing a trademark (for example, <trademark> 405) and the Whois data (or other registrant identifying data) for the registrant of the domain. For example, the number of domains extracted 415 (859, 610, 116, 41, respectively for each of the trademarks 405) is a subgroup of the number of CS domains 410 (for example, shown as 4774, 1360, 616, 489, respectively).

The number of domains with different registrant name than the others 420 includes domains which contain a feature word in each nameserver group. In other words, number of domains with different registrant name than the others 420 represents the number of domain names with different registrant names, so for example, in case of Company W trademark, 464 domains out of 859 detected domains have a unique registrant name. The number of domains with different registrant name than the others 420 (for example, shown as 464, 179, 54, 26, respectively) is a subgroup of the number of number of domains extracted 415 (859, 610, 116, 41, respectively for each of the trademarks 405). The feature words 310 in these instances are likely associated with malicious entities. The example embodiments provide a process to identify these domains. The example embodiments provide a process to identify registrants even if the registrants are anonymized.

FIG. 8 is a block diagram showing a domain name registrant listing, in accordance with example embodiments of the present invention.

As shown in table 500, the extracted table includes domain names 315 with variations of trademarked words (for example, Revle and rCloud, which are shown as misspelled, illustrating that malicious domain registrants can use slight variations of a legitimate name to redirect traffic to websites for illegitimate purposes) and an identified registrant name 320 (for example, Barbara Lynn Miswas, Brian Smithkeller, C R Redwards, etc.) and registrant country 325 (for example, United Kingdom, Australia, etc.). Cybercriminals are known to, in some instances, use particular name servers and or a certain service to register domains for attack. The systems in some instances may allow interaction with those nameservers as legitimate users can also be registered on these same nameservers (for example, from a domain registration service or rental server service, etc.).

The example embodiments allow systems to identify registrants by nameserver. Each nameserver group possibly contains multiple domains registered by an identical registrant. In this manner domains which have anonymized registrant identifying information (for example, Whois data) can be identified as probably (or possibly) associated with other potentially malicious domains registered on the same nameserver.

The systems 200 can determine not to group by registrant name 320 (for example, RegistrantName) to prevent incorrect or anonymous data provided by the registrant from obscuring the connections between potentially malicious domain names. For example, the system 200 can identify and group entries with a same nameserver with a same feature word despite variations in the registrant names or anonymized data (for example, variations of names and anonymized information associated with a same person or entity, such as John Smith, smith john, and a Whois: Privacy Guard, etc.).

Figure 9:
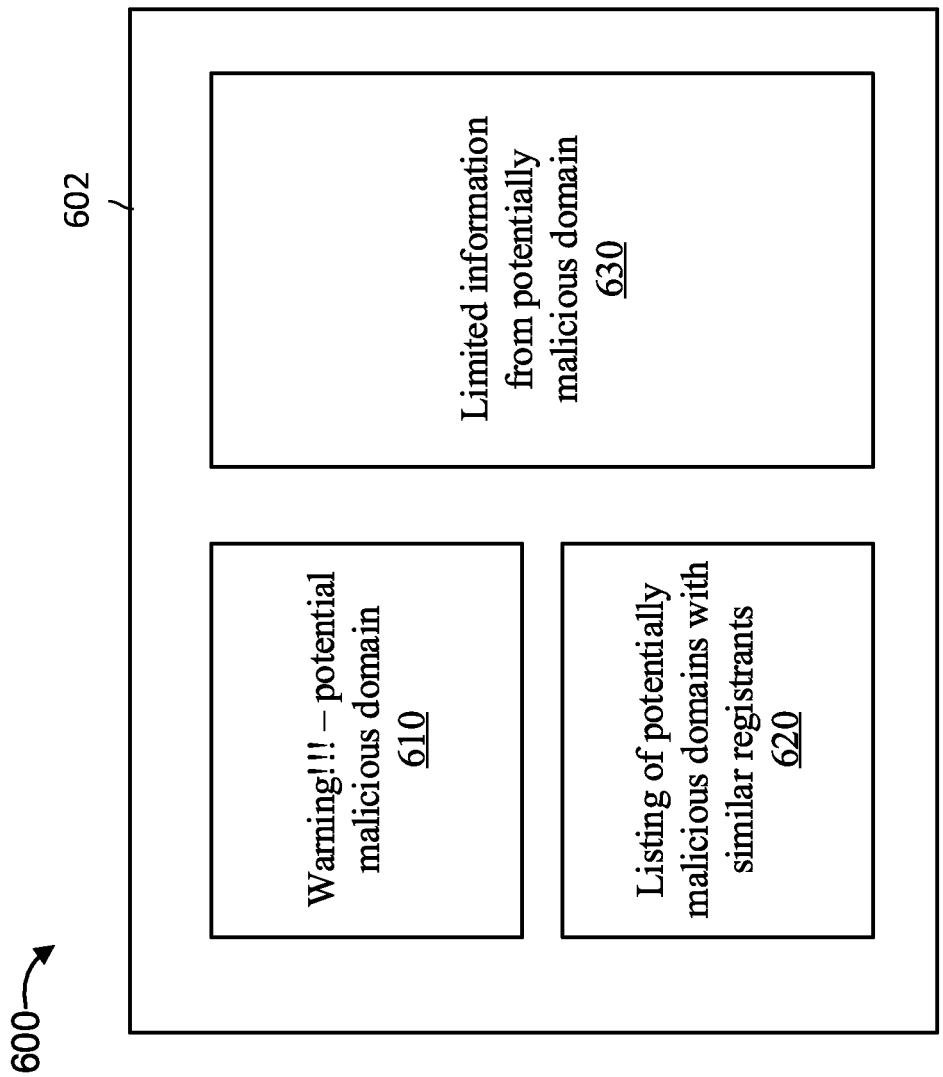
FIG. 9 is a block diagram showing an interface associated with the system for combo-squatting domain linkage, in accordance with an embodiment of the present invention.

Referring now to FIG. 9, an illustrative graphical user interface (GUI) 600 is shown, in accordance with example embodiments of the present invention.

As shown in FIG. 9, the system 200 can provide warnings 610, and listing of domains with similar registrants to a device 602. The device 602 can include any computing device that has access to domains, particularly to potentially malicious domains. The system 200 (which can be deployed in a cloud, on the device, or on a server, etc.) can receive a request to identify the domains and provide warnings 610 of potentially malicious domains or a listing of the potentially malicious domains with similar registrants 620 (for example, based on nameserver grouping). The system 200 can highlight the feature word in the potentially malicious domain names, such as providing a list in a similar manner as tables 300 to 350, described herein above with respect to FIGS. 3 to 6. The system 200 can display limited (or, for example, minimal, filtered, etc.) information from the potentially malicious domain 630. The system 200 can also identify anonymous registrants as associated with at least one of malicious and potentially malicious domains.

In some instances, the system 200 can provide an alert to systems associated with proprietors of legitimate nameservers (for example, where appropriate and/or permitted by applicable systems and legal framework).

Figure 10:
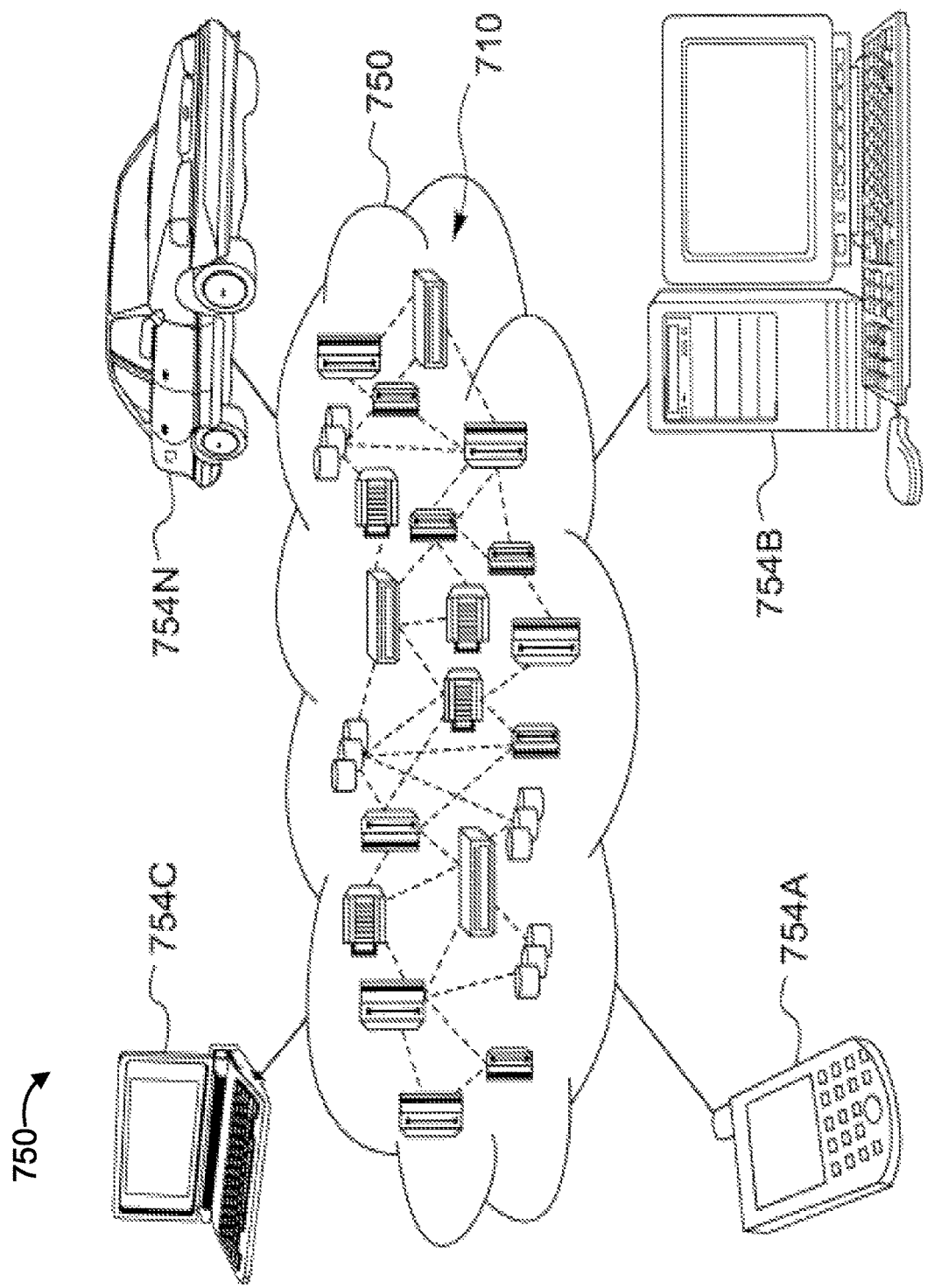
FIG. 10 is a block diagram showing an illustrative cloud computing environment having one or more cloud computing nodes with which local computing devices used by cloud consumers communicate, in accordance with an embodiment of the present invention.

Referring now to FIG. 10, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 10 are intended to be illustrative only and that computing nodes 710 and cloud computing environment 750 can communicate with any type of computerized device over any type of network and/or network addressable connection (e.g., using a web browser).

Figure 11:
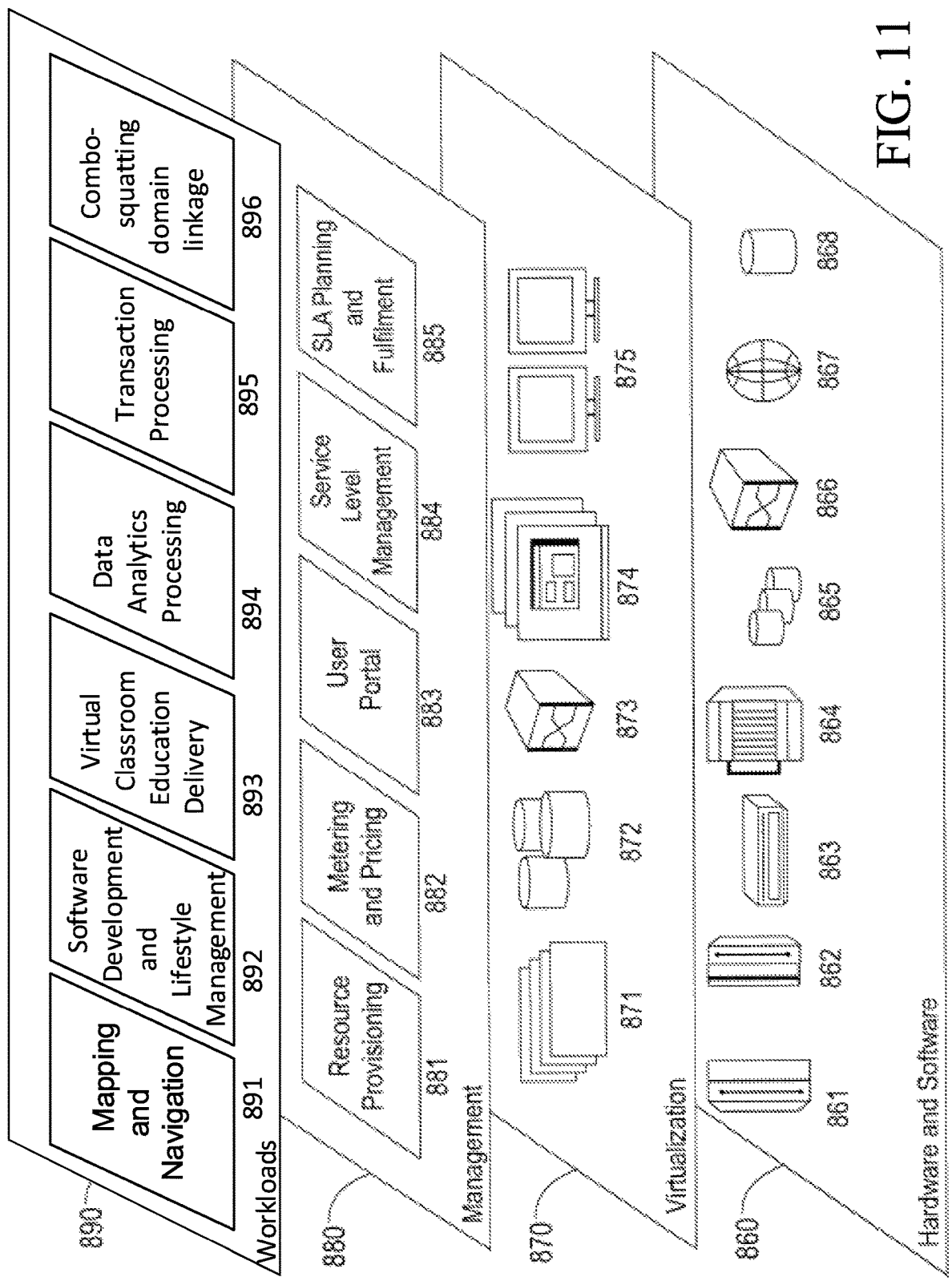
FIG. 11 is a block diagram showing a set of functional abstraction layers provided by a cloud computing environment, in accordance with an embodiment of the present invention.
Figure 12:
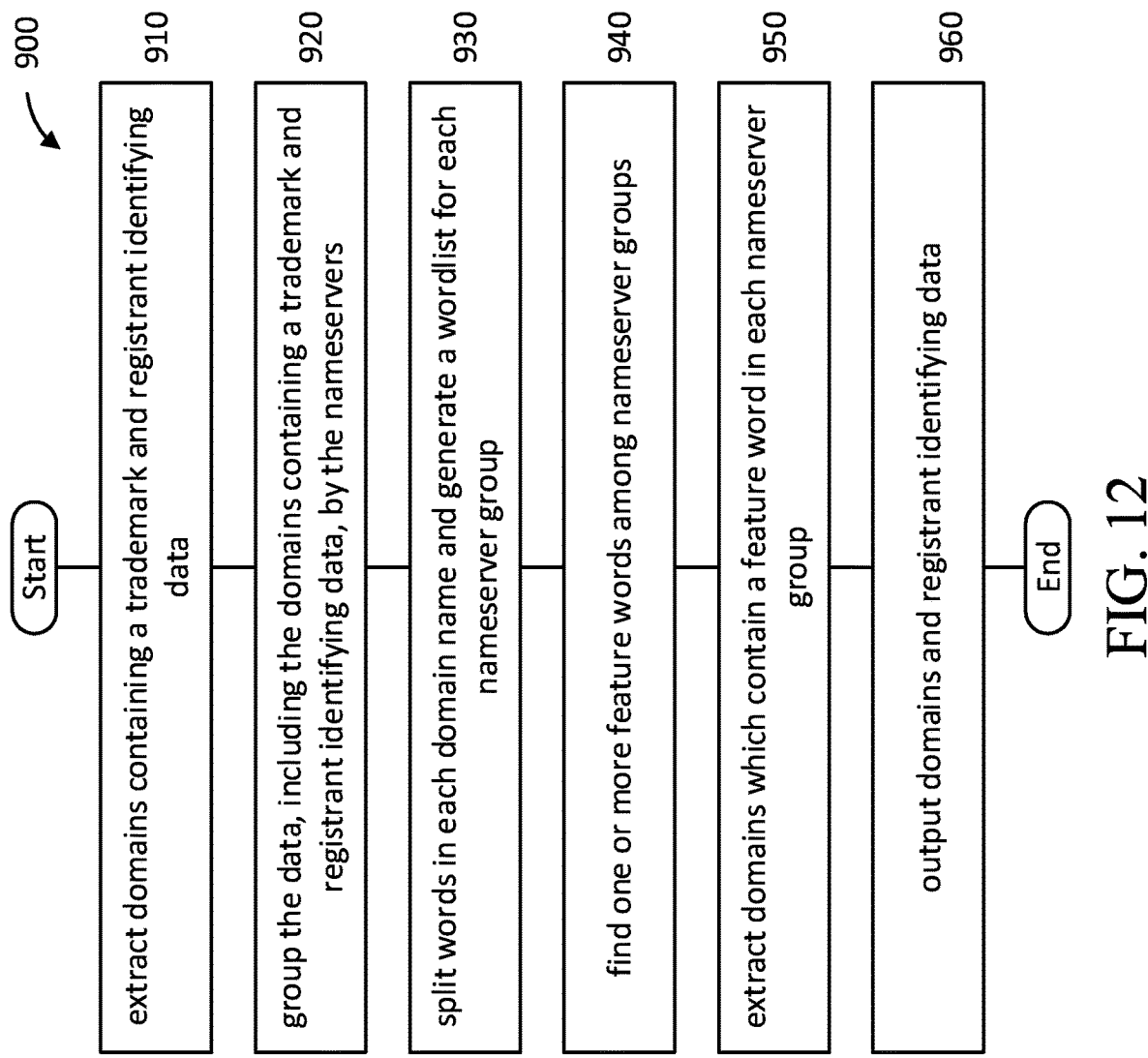
FIG. 12 is a flow diagram showing a method for combo-squatting domain linkage, in accordance with an embodiment of the present invention.

Referring now to FIG. 11, a set of functional abstraction layers provided by cloud computing environment 750 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and combo-squatting domain linkage 896.

With reference to FIG. 102, a flow diagram is shown illustrating a method 900 for combo-squatting domain linkage, in accordance with an embodiment.

In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

At block 910, the system 200 extracts domains containing a trademark (for example, <trademark>, etc.) and registrant identifying data (for example, Whois data, etc.). System 200 can extract a plurality of domain names containing at least one trademark and registrant identifying data for a plurality of domains. The system 200 can extract (or derive, deduce, request, determine or find) the data from the appropriate database, listing or other source.

At block 920, the system 200 groups the data (for example, including the domains containing a trademark and registrant identifying data) by the nameservers associated with the data (and domains). The system 200 can designate this as a nameserver group(s). For example, system 200 can group data by a first name server (NSG1 222-1), a second nameserver (NSG2 222-2) and a third nameserver (NSG3 222-3), as described herein above with respect to FIG. 2. The system 200 groups domain names from the plurality of domain names into at least one nameserver group based on a nameserver for each of the plurality of domains. The system 200 may also group trademarks based on a common ownership of the trademarks or based on similarity of services provided.

At block 930, the system 200 splits words in each domain name and generates a wordlist for each nameserver group. The system 200 can split the words in each domain name based on extracting trademark words and other words that are included in the domain name.

At block 940, the system 200 finds (one or more) feature words among nameserver groups. IDF is a measure of how much information the word provides, for example, if the word is common or rare across all documents. Rare words will have more weight value than common words in IDF At block 950, the system 200 extracts (potentially malicious) domains which contain a feature word in each nameserver group. Potentially malicious domain names link to dom ains that can include malicious activity (for example, phishing, computer virus, intrusive programs, cybercriminals, etc.).

At block 950, the system 200 outputs domains and registrant identifying data (for example, Whois data) which may be registered by some identical persons. According to an embodiment, the system 200 analyzes words or text and determines a vector and/or numeric (or value or attribute or distance or measure) associated with the feature word. System 200 can analyze whether any of the linked domains exhibit behavior associated with impersonation or squatting or "combo-squatting" or "domain squatting" including providing additional reports on any reported phishing, virus and other malicious activity associated with the registrant and/or any of the linked domain names.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for linking combo-squatting domains, comprising:
   grouping, by a processor device, domain names from a plurality of domain names into at least one nameserver group based on a nameserver for each of a plurality of domains, wherein each of the plurality of domain names contain at least one valued word;
   splitting words in each domain name and generating a wordlist for each of the at least one nameserver group;
   finding, by the processor device, at least one feature word among the at least one nameserver group;
   extracting malicious domain names which contain the at least one feature word in each of the at least one nameserver group; and
   outputting, for each of the at least one nameserver group, the malicious domain names and corresponding registrant identifying data based on the at least one feature word.

2. The method of claim 1, further comprising:
   identifying at least one of the malicious domain names as associated with malicious activity.

3. The method of claim 1, wherein outputting, for each of the at least one nameserver group, the malicious domain names and the corresponding registrant identifying data further comprises:
   outputting at least one of registrant identifying information and a registrant country for the malicious domain names grouped based on the at least one feature word and the at least one nameserver group.

4. The method of claim 1, further comprising:
   identifying an anonymous registrant as associated with at least one malicious domain.

5. The method of claim 1, further comprising:
   blocking access to a malicious domain associated with at least one of the malicious domain names.

6. The method of claim 1, further comprising:
   implementing, based on the malicious domain names and the corresponding registrant identifying data, at least one precautionary measure to limit access to a target selected from the group including a device, information generated by a user of the device, and a network associated with the device.

7. The method of claim 1, further comprising:
   grouping at least two of a plurality of trademarks based on a common ownership.

8. The method of claim 1, wherein the at least one trademark is a plurality of trademarks, further comprising:
   grouping at least two of the plurality of trademarks based on a similarity in services associated with the at least two of the plurality of trademarks.

9. The method of claim 1, further comprising:
   identifying a commonly used word as the at least one feature word.

10. The method of claim 1, further comprising:
    identifying a unique word as the at least one feature word.

11. A system for linking combo-squatting domains, comprising:
    a memory device having program code stored thereon; and
    at least one processor device operatively coupled to the memory device and configured to execute the program code stored on the memory device to:
    group domain names from a plurality of domain names into at least one nameserver group based on a nameserver for each of the plurality of domains, wherein the plurality of domain names each contain at least one valued word;
    split words in each domain name and generate a wordlist for each of the at least one nameserver group;
    find, from the wordlist, at least one feature word among the at least one nameserver group;
    extract malicious domain names which contain the at least one feature word in each of the at least one nameserver group; and
    output, for each of the at least one nameserver group, the malicious domain names and corresponding registrant identifying data based on the at least one feature word.

12. The system of claim 11, wherein the at least one processor device is further configured to execute program code stored on the memory device to:

identify at least one of the malicious domain names as associated with malicious activity.

13. The system of claim 11, wherein, when outputting, for each of the at least one nameserver group, the malicious domain names and the corresponding registrant identifying data, the at least one processor device is further configured to:
output at least one of Whois information and a registrant country for the malicious domain names grouped based on the at least one feature word and the at least one nameserver group.

14. The system of claim 11, wherein the at least one processor device is further configured to execute program code stored on the memory device to:
identify an anonymous registrant as associated with at least one of malicious and malicious domains.

15. The system of claim 11, wherein the at least one processor device is further configured to execute program code stored on the memory device to:
block access to a malicious domain associated with at least one of the malicious domain names.

16. The system of claim 11, wherein the at least one processor device is further configured to execute program code stored on the memory device to:
implement, based on the malicious domain names and the corresponding registrant identifying data, at least one precautionary measure to limit access to at least one of a device, information generated by a user of the device, and a networks associated with the device.

17. The system of claim 11, wherein the at least one trademark is a plurality of trademarks, wherein the at least one processor device is further configured to execute program code stored on the memory device to:
group at least two of the plurality of trademarks based on a common ownership of the at least two of the plurality of trademarks.

18. The system of claim 11, wherein the at least one trademark is a plurality of trademarks, wherein the at least one processor device is further configured to execute program code stored on the memory device to:
group at least two of the plurality of trademarks based on a similarity in services associated with the at least two of the plurality of trademarks.

19. The system of claim 11, wherein the at least one processor device is further configured to execute program code stored on the memory device to:
identify a commonly used word as the at least one feature word.

20. A non-transitory computer readable storage medium comprising a computer readable program for linking combo-squatting domains, wherein the computer readable program when executed on a computer causes the computer to perform the steps of:
grouping, by a processor device, domain names from a plurality of domain names into at least one nameserver group based on a nameserver for each of a plurality of domains, wherein the plurality of domain names each contain at least one valued word;
splitting words in each domain name and generating a wordlist for each of the at least one nameserver group;
finding, by the processor device, at least one feature word among the at least one nameserver group;
extracting malicious domain names which contain the at least one feature word in each of the at least one nameserver group; and
outputting, for each of the at least one nameserver group, the malicious domain names and corresponding registrant identifying data based on the at least one feature word.

* * * * *